J. P. HIGLEY.
PISTON RING.
APPLICATION FILED FEB. 1, 1917.
1,301,438. Patented Apr. 22, 1919.
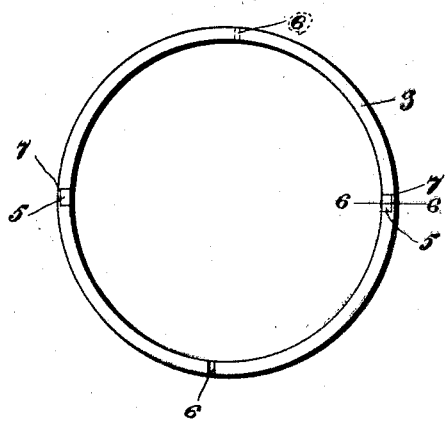
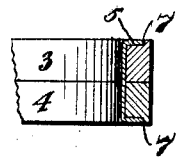
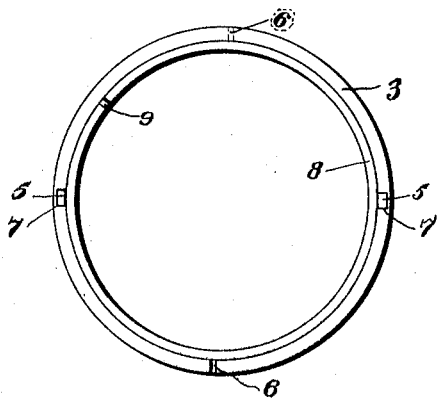
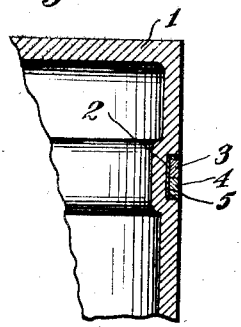
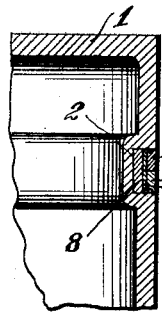
Inventor
John P. Higley
By
John C. Higdon
Atty.

UNITED STATES PATENT OFFICE.

JOHN P. HIGLEY, OF ST. LOUIS, MISSOURI, ASSIGNOR OF ONE-FOURTH TO JOSEPH RUGGABER AND ONE-FOURTH TO GEORGE FLANNERY, BOTH OF ST. LOUIS, MISSOURI.

PISTON-RING.

1,301,438.           Specification of Letters Patent.     Patented Apr. 22, 1919.

Application filed February 1, 1917. Serial No. 145,833.

*To all whom it may concern:*

Be it known that I, JOHN P. HIGLEY, a citizen of the United States, and resident of St. Louis, Missouri, have invented certain new and useful Improvements in Piston-Rings, of which the following is a specification containing a full, clear, and exact description, reference being had to the accompanying drawings, forming a part hereof.

My invention relates to an improved piston ring, and consists in the novel construction and arrangement of parts hereinafter described and particularly pointed out in the annexed claims.

The object of my invention is to provide an improved piston ring which shall be highly efficient in high-compression internal-combustion engines, in preventing leakage of the gases past the piston, and yet not stick or bind during use, although simple in construction and of low cost.

In the drawings,

Figure 1 is a plan view of the preferred form of my piston ring, having twin rings bound together in tandem form with clamps or clips.

Fig. 2 is a plan view of a modification, consisting of the twin tandem rings, having a wider base ring within them.

Fig. 3 is a side elevation of the twin rings.

Fig. 4 is a vertical section of a portion of a piston with the preferred two rings in place.

Fig. 5 is a view similar to Fig. 4, with the modified form of my invention in place therein.

Fig. 6 is a detail vertical section, with parts enlarged, taken on the line 6—6 of Fig. 1.

The numeral 1 designates a piston of the ordinary construction, having the usual circumferential groove 2 to receive the packing ring which preferably consists of the twin primarily-separated complete circular split one-piece rings 3 and 4 placed side by side and connected by opposite spring clamps or clips 5.

Said two rings 3 and 4 together are about the width of the said groove 2, and are of such thickness as to just fill said groove, as shown more clearly in Fig. 4.

The abutting ends of said split rings 3 and 4 are beveled, or otherwise provided with a common lap-joint 6, so that they will fit together and prevent leakage when said rings are compressed within said groove.

Said twin rings 3 and 4 are so placed in relation to each other as to break joints, the joint 6 of one ring being located (preferably) as shown diametrically opposite that of the other ring of the pair.

Said twin rings 3 and 4 are yieldingly yet detachably and securely bound together by means of said spring clamps or clips 5 which are substantially V-shaped in edge-elevation, and located diametrically opposite each other, upon the inner periphery of said rings, but set into suitable recesses 7, so that said clips will not project beyond the rings at any point, but will lie flush with the outer edges and inner peripheries of the rings, when the rings are together. No other fastening is used, or is necessary, in yieldingly and detachably securing the one-piece twin rings together, inasmuch as the said U-shaped clips 5 have their bent ends located in the said recesses 7 upon the outer edges of both rings at opposite points thereon, the resiliency of said clips being such that they retain their position solely by frictional contact with the rings.

The utility of the clip-seats 7 in the internal peripheries of the rings 3 and 4 exists in the fact that the said spring clips 5 are thereat seated so that they lie flush with the said inner peripheries, and thus do not project beyond said peripheries to interfere with the action of the rings in the piston groove; and besides, by extending said clip-seats from the outer edges of said rings across their inner peripheries (as shown) the relative rotation of the rings is prevented in a more efficient manner.

In the modification shown in Figs. 2 and 5, I have shown an inner split ring 8 having its abutting ends beveled or cut at an inclination 9 (or otherwise provided with a common lap joint), and said inner ring is of a width to fit said groove 2, and is placed within said twin rings 3 and 4, to form a base therefor, and to rest adjacent the bottom of said groove.

Before the rings are placed in the piston-groove 2 the said wide inner ring 8 acts as a retainer for the said clips 5, holding same securely in place in their seats, and preventing same from being lost.

The rings are all formed so that, as usual, they will have a tendency to spring open, and when forced into the piston-grooves and the piston placed within its cylinder, the twin rings will yieldingly engage the inner wall (or rather the bore) of the cylinder and form a tight joint therewith.

The wide inner ring acts as a yielding base for the narrower outer rings, and holds the latter in contact with the bore of the cylinder with sufficient force to prevent leakage, and yet permit the outer rings to yield sufficiently to obviate undue friction, wear, or binding during use.

I particularly claim the following as my invention:

1. An improved piston-ring, composed of twin primarily-separated complete circular one-piece split rings, placed side by side and having oppositely-alined recesses in their outer edges, and separate binding devices in the form of U-shaped spring clips having their opposite ends mounted in said recesses, to yieldingly and detachably bind said rings together, and prevent their relative rotation.

2. An improved piston-ring composed of a pair of primarily-separated complete circular one-piece split rings placed side by side and having oppositely-alined clip-seats in their outer edges, and in their internal peripheries at diametrically-opposite points; and separate binding devices in the form of U-shaped clamping clips located detachably in said seats, flush with the internal periphery and outer edges of said rings.

3. An improved piston-ring composed of a pair of primarily-separated complete circular one-piece split rings placed side by side and having oppositely-alined clip-seats formed in their outer edges and in their internal peripheries, at diametrically-opposite points, with the joints of their ends diametrically-opposite; and separate binding devices in the form of U-shaped spring clamping clips located detachably in said seats.

4. An improved piston-ring, composed of two primarily-separated complete circular one-piece rings having clip-seats formed in them and placed side by side and having broken joints, spring clips which are located in said seats in said rings, to bind same together, and to prevent relative rotative movement of said rings, and a wider split ring located within said two rings, to form a base for the latter, and to hold said clips in said seats.

In testimony whereof, I have signed my name to this specification, in presence of two subscribing witnesses.

JOHN P. HIGLEY.

Witnesses:
GEORGE E. FLANNERY,
JOHN C. HIGDON.

Copies of this patent may be obtained for five cents each, by addressing the "Commissioner of Patents, Washington, D. C."